United States Patent [19]

Kramer

[11] Patent Number: 4,564,909
[45] Date of Patent: Jan. 14, 1986

[54] ERROR SENSING SYSTEM FOR VESSELS WITH ABSOLUTE ZERO REFERENCING

[75] Inventor: Melvin G. Kramer, Riverton, Wyo.

[73] Assignee: The Brunton Company, Riverton, Wyo.

[21] Appl. No.: 547,028

[22] Filed: Oct. 31, 1983

[51] Int. Cl.$^4$ .............................................. G05D 1/00
[52] U.S. Cl. .................................... 364/457; 364/571; 318/588; 114/144 RE; 33/363 K
[58] Field of Search ............... 364/443, 447, 457, 571; 318/588; 340/987, 347 P; 114/144 R, 144 RE; 33/363 K, 363 R, 356

[56] References Cited

U.S. PATENT DOCUMENTS

| | | | |
|---|---|---|---|
| 3,699,420 | 10/1972 | Kundler et al. | 318/588 |
| 3,746,842 | 7/1973 | Fowler | 340/347 P |
| 3,833,901 | 9/1974 | Fowler | 340/347 P |
| 3,975,621 | 8/1976 | Fowler | 364/575 |
| 4,040,374 | 8/1977 | Greene | 114/144 |
| 4,101,882 | 7/1978 | Kramer | 340/347 P |
| 4,117,602 | 10/1978 | Lapeyre | 33/363 K |
| 4,190,962 | 3/1980 | Lyman, Jr. | 33/363 K |
| 4,414,754 | 11/1983 | Lapeyre | 33/363 K |

Primary Examiner—Gary Chin
Attorney, Agent, or Firm—John E. Reilly

[57] ABSTRACT

An error sensing system for use in marine autopilot systems of the type having a photographic film compass disk aligned with the direction North and sensing means associated with the disk is operative to sense relative movement between the disk and the sensors in response to changes in the heading of the vessel. A first direction error surface portion on the disk has opaque and transparent areas defining a zero reference therebetween, a second magnitude error surface portion on the disk has a second zero reference position in predetermined relation to the first zero reference position and an area of variable transparency extending along the second surface portion. The first and second surface portions are defined by images along the peripheral surface of the photographic film disk. The disk sensing system has first and second light sensors aligned with the first and second surface portions, respectively, to generate direction error and magnitude error signals representative of the direction and extent of movement of the vessel away from a given heading.

15 Claims, 14 Drawing Figures

ERROR SENSING SYSTEM FOR VESSELS WITH ABSOLUTE ZERO REFERENCING

This invention generally relates to error sensing systems; and more particularly relates to a novel and improved error sensing system in an automatic steering mechanism for vessels, such as, marine craft and the like.

BACKGROUND AND FIELD OF THE INVENTION

Automatic pilot systems for marine vessels are generally characterized by following a compass heading, and if the vessel should deviate from a given course, an error signal is generated causing a control circuit to drive a rudder or other steering control so as to correct for the deviation. Any number of autopilot systems have been developed in the past to accomplish this desired end. For the most part, these systems will sense the magnitude of error or change in course with respect to a reference setting, such as for instance, by averaging compass heading indications or by employing a digital disk. Typical of such approaches are those disclosed in U.S. Pat. Nos. 3,833,901 and 3,975,621 to J. T. Fowler, and 4,040,374 to L. M. Greene.

In my copending application for patent, Ser. No. 405,986, filed Aug. 6, 1982 and entitled "Autopilot System", another type of autopilot system is disclosed for steering a marine vessel and maintaining it on a predetermined course through the combination and arrangement of an incremental encoder together with a heading reference circuit. There, an encoder includes circuitry which will generate a directional signal and count pulse for each increment of movement from the vessel away from a preset heading, and the heading reference circuit has adjustable reference setting means which will set a counter at a reference position corresponding to the preset heading, the counter being responsive to the pulses received from the encoder to count either in a positive or negative direction depending upon whether the pulses received are either positive or negative with respect to the reference position. A correction signal is then generated to drive an analog device for a steering control mechanism, such as, a rudder in order to return the vessel to its preset heading or course.

In the instant invention, it is proposed to provide an error sensing system with an absolute zero or null position that will not drift with time or temperature but at the same time is greatly simplified while avoiding errors that could otherwise result from changes due to component aging, voltage changes, temperature variations and the like, and further obviates the use of relatively complex or sophisticated electronic circuitry. Moreover, the system as devised is extremely versatile and readily conformable for use with various types of marine craft including sailboats.

SUMMARY OF THE INVENTION

It is therefore an object of the present invention to provide for a novel and improved error sensing system which is specifically adaptable for use in sensing angular displacement, such as, in marine autopilot systems.

It is another object of the present invention to provide a novel and improved system for automatic steering of a vessel in which deviations of the vessel from a given course can be accurately and rapidly sensed and corrected.

It is a further object of the present invention to provide for a novel and improved automatic steering control system for a vessel which is simple and inexpensive to manufacture and operate; and further wherein the system is readily conformable for use with various type of marine vessels and contains an error sensing system which is capable of sensing and correcting for deviations of the vessel relative to a given direction or relative to wind direction.

Yet another object of the present invention is to provide for a novel and improved autopilot system having a magnetic North error sensing apparatus which is not subject to drift with time or temperature and wherein the shape of the error response can be programmed into the apparatus so as to be any linear or non-linear function of heading error.

Additionally, it is an object of the present invention to provide in an automatic steering control apparatus for a magnetic North error sensing system having an absolute zero or null position which is not subject to drift and which is capable of rapidly and accurately sensing both the direction and magnitude of heading errors and of generating either a linear or non-linear response to such errors.

In accordance with the present invention there has been devised in a preferred embodiment of the present invention an error sensing system for use in automatic steering control apparatus in marine vessels of the type having a compass disk aligned with the direction North and sensing means associated with the disk which is operative to sense relative movement between the disk and said sensing means in response to changes in the heading of the vessel. The improvement resides in a first direction error surface portion on the disk having opaque and transparent areas defining a zero reference therebetween, a second magnitude error surface position on the disk having a second zero reference position in predetermined relation to the first zero reference position and an area of variable transparency extending along the second surface portion. The sensing means associated with the disk has first and second light sensors which are aligned with the first and second surface portions, respectively, to generate direction error and magnitude error signals representative of the direction and extent of movement of the vessel away from a given heading. Preferably, the disk is formed of a photographic film and the first and second surface portions are defined by images placed along the outer peripheral surface of the film and wherein the first light sensor will generate a positive or negative direction error signal depending upon whether the disk is advanced from the first zero reference position across the opaque area or the transparent area. The second light sensor will generate a signal according to the light intensity or irradiance passing through the second surface portion, this light intensity being controlled by the amount or degree of transparency of the disk. This transparency may be closely controlled by changing the density of dots or dot patterns on the photographic film so that the greater the transparency, the more energy transmitted to the detector. The transparency of the second surface portion is regulated such that it is opaque at zero and increases in transparency to full transparency in both circumferential directions away from zero.

The present invention is best typified by describing its construction and operation in relation to marine autopilot systems which must be capable of accurately sensing both the direction and magnitude of deviation of marine craft from a given course. An aperture plate is mounted on a housing, and a compass disk is suspended in the housing so as to be free to rotate relative to the housing in following deviations of the vessel from the desired course. Furthermore, the aperture plate is capable of being rotated relative to the vessel, for example, in establishing a new heading of course. Close control of a vessel presents certain problems in that the gain of the vessel is not constant but varies with the speed of the ship. Secondly, the time constants associated with the response of the ship are a function of speed. Moreover, the entire steering process is non-linear. It is therefore desirable to provide an error sensing system in which the error response in the system can be tailored in a unique manner so as to compensate for system non-linearities associated with different vessels and without requiring modification or constant readjustment of the control circuitry or servo control system.

Other objects, advantages and features of the present invention will become more readily appreciated and understood when taken together with the following detailed description in conjunction with the accompanying drawings, in which:

DETAILED DESCRIPTION OF THE PREFERRED EMBODIMENT

Figure 1:
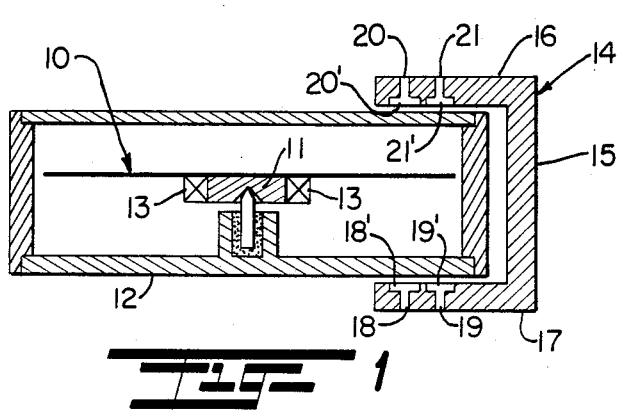
FIG. 1 is a perspective view illustrating a preferred mounting and disposition between an aperture plate, housing and compass disk.
Figure 2:
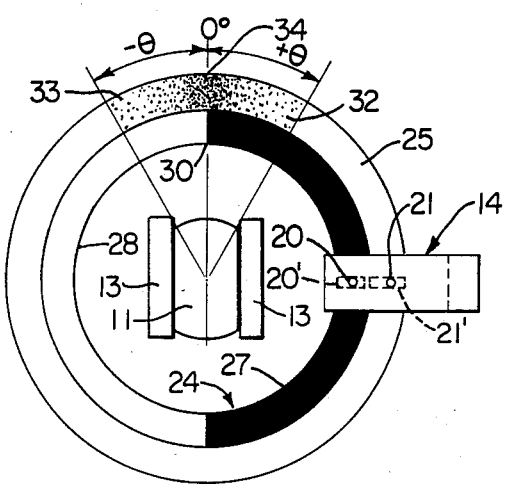
FIG. 2 is a plan view of the preferred form of compass disk suspended in a housing and the aperture plate rotated 90° from the reference position.

Referring in more detail to the drawings, there is illustrated in FIGS. 1 and 2 a preferred form of compass having a flat compass disk 10 comprised of a photographic film suspended on a pivot mount 11 centrally of a fluid-filled vial 12. Magnets 13 are aligned in spaced parallel relation to one another on opposite sides of the pivot mount so that the disk 10 is free to rotate and seek North. The fluid-filled vial damps the movement of the compass disk 10, and an aperture plate 14 is in the form of a yoke having a closed end 15 and upper and lower extensions 16 and 17 which straddle the outer circumferential surface portion of the vial 12. The lower extension 17 contains radially spaced infrared emitters 18 and 19 which direct near infrared energy through radially spaced slots 18' and 19' aligned with the respective emitters. In turn, sensors 20 and 21 are aligned over radially spaced slots 20' and 21', respectively, in the inner surface of the upper extension 16 and in aligned relation to the emitters 18 and 19. The light sensor slots 20' and 21' are located in close proximity to the upper surface of the vial and, for example, by reference to FIG. 2, the emitter 18 and sensor 20 are located in alignment with an inner concentric track 24; and emitter 19 and sensor 21 are aligned with outer concentric track 25, the tracks 24 and 25 preferably being formed as a unitary part of the disk 10 in a manner hereinafter described.

The inner concentric track 24 defines a first direction error surface portion having circumferentially opaque and transparent areas 27 and 28, respectively, which extend away from a common zero reference area or position 30 which is formed at the juncture of the opaque and transparent areas. The outer concentric track 25 defines a second magnitude error surface portion which in the preferred form has limited circumferential surface areas as designated at 32 and 33 which are of variable transparency over a limited surface portion of the outer concentric track 25 and which specifically vary in transparency away from a second common zero reference area or position as designated at 34. In the preferred form the areas 32 and 33 of variable transparency are opaque at zero and increase in transparency to full transparency over the angles "$\theta$" away from the zero reference position 34. It will be apparent that it is not necessary to vary the amount of transparency over the entire 180° but may be over any incremental area less than 180°. For instance, the variable transparency may be over 15° from the zero reference position proceeding symmetrically in each circumferential direction. Any angle greater than 15° will permit the light sensor to generate a maximum signal and, as long as that maximum signal is generated, will indicate an error in heading causing maximum correction signals to be generated until the vessel returns to within the variable transparency area. At this point, the signal will progressively lessen in intensity until the aperture plate realigns itself with the zero reference positions.

Figure 3:
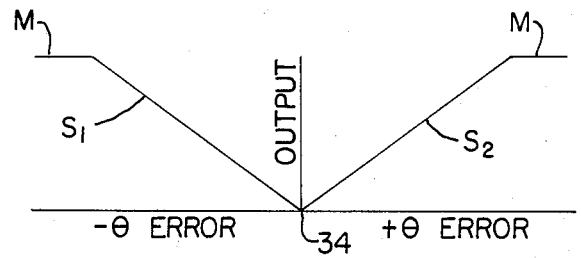
FIG. 3 is a schematic view illustrating the nature of signals generated by the magnitude error surface portion of the disk.
Figure 4:
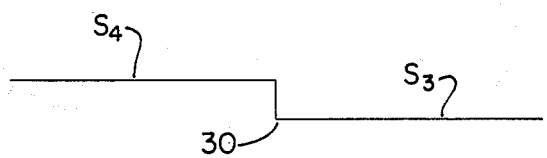
FIG. 4 is a view schematically illustrating the signal generated by the direction error surface portion of the disk.
Figure 5:
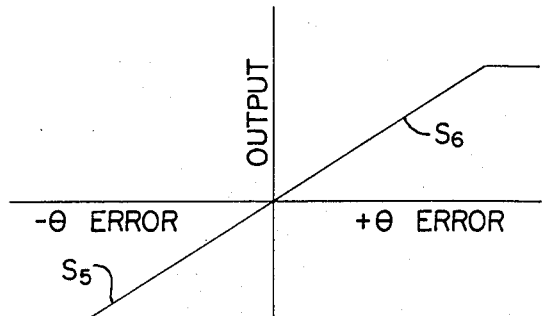
FIG. 5 is a view illustrating the bipolar signal resulting from multiplexing of the direction error and magnitude error signals from FIGS. 3 and 4.

In accordance with well-known principles, the compass disk 10 is aligned such that the reference positions 30 and 34 will seek North under the influence of the magnets 13, but the aperture plate 14 is journaled by slip rings, not shown, with respect to the center pivot and is normally fixed to the vessel so as to follow its deviation away from a given course. However, the aperture plate can be positively advanced or rotated with respect to the vessel in order to change the course of the vessel. Accordingly, any deviation of the heading of the vessel will cause the aperture plate 14 to be rotated relative to the compass disk so as to advance away from the zero reference positions 30 and 34 and across the opaque or transparent areas of the tracks 24 and 25. Light intensity or irradiance can be measured in MW/CM$^2$. Thus, each light sensor 20 and 21 will generate a signal the output of which is directionally proportional to the irradiance at its input. Stated another way, the light intensity is a function of the transparency of the disk so that the greater the transparency, the greater the energy transmitted by the light sensor. For instance, if the vessel should deviate in a counterclockwise direction away from the zero reference positions 30 and 34, the inner light sensor 20 will receive maximum light intensity through the transparent area 28 to indicate movement in a negative direction; whereas counterclockwise movement across the opaque area 27 will generate minimum light intensity in the light sensor 20 to indicate movement in the opposite or positive direction. Thus, its output is a binary response to indicate whether the error is negative or positive as diagrammatically shown in FIG. 4. At the same time, movement of the aperture plate in a counterclockwise direction with respect to the compass disk across the area of variable transparency 33 will cause generation of a signal directly proportional to the light intensity passed through the area 33. As diagrammatically shown in FIG. 3, this signal will increase in magnitude in a direction proportional to the increase in transparency in either direction away from the zero reference position to the maximum as designated at M in FIG. 3. Assuming that the increase in transparency is a linear function of the degrees of movement away from zero, the magnitude error output signal will increase along a straight line as indicated at $S_1$ and $S_2$ in FIG. 3. FIG. 4 diagrammatically illustrates the binary signals $S_3$ and $S_4$ generated by the direction error tracks 27 and 28, respectively, in response to deviation in one direction or the other away from the zero reference position 30. FIG. 5 in turn merely illustrates the resultant output signals $S_5$ and $S_6$ of the direction error and magnitude error signals of FIGS. 3 and 4 which are alternately selected depending upon which direction the vessel deviates away from the zero reference positions as hereinafter described in more detail with reference to FIG. 6.

Figure 6:
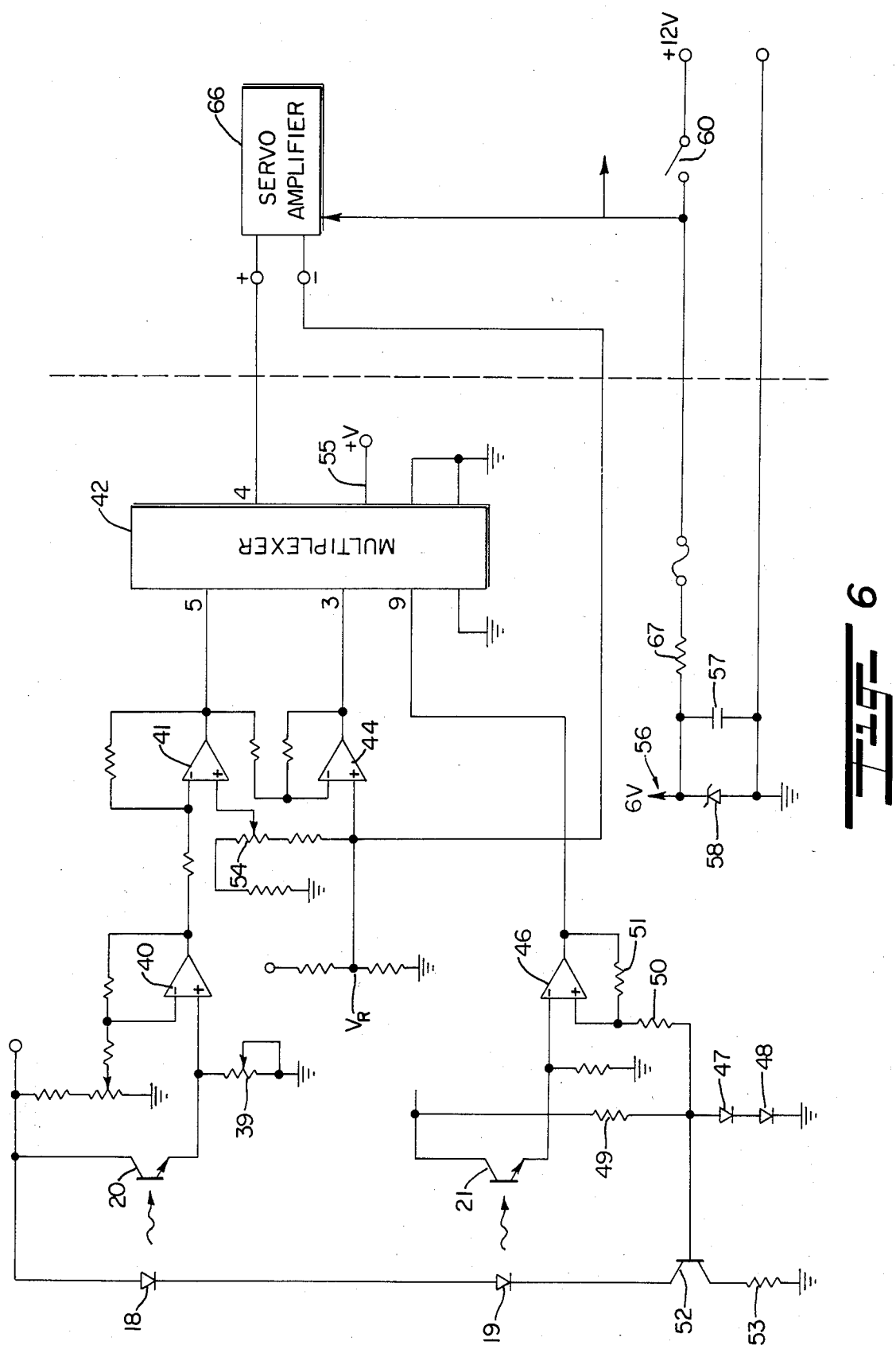
FIG. 6 is a schematic illustration of the control circuit employed to develop bipolar error signals as illustrated in FIGS. 3 to 5.

Referring to FIG. 6, the light sensor or phototransistor 20 receives near I.R. energy from the emitter 18 via the magnitude error track 25 on the compass disk. The current output of the light sensor 20 is proportional to the increase in transparency of the track 25 and is converted to a voltage by a trim pot 39 at the positive side of the comparator 40. This voltage is amplified by the operational amplifier 40 then directed to the negative side of an inverting, level shift circuit 41 where the magnitude error signal is level-shifted to a reference voltage $V_r$, which will serve as the output signal common. The output from the level shift circuit 41 is directed also to pin 5 of a multiplexer 42 and is directed at the same time into the negative side of an inverting amplifier 44 and output to pin 3 of the multiplexer 42 from the output of amplifier 44. The multiplexer 42 can select either the signal on pin 5 or pin 3 as its output and apply same over pin 4 to the positive side of a servo amplifier 66.

The light sensor or phototransistor 21 also receives near I.R. energy from the error direction track 24 and, depending upon whether the track is clear or opaque, will direct a negative or positive error signal to the negative side of a level detector 46. The reference level of the detector 46 is determined by two diodes 47 and 48 and a resistor 49 which establishes the reference point at which the level detector switches between positive and negative. The resistors 50 and 51 establish a positive feedback which results in a small amount of hysteresis so that once the detector switchs in one direction or another it will remain there. The transistor 52 and resistor 53 provide a current source for the sensor 19. The output of the level detector is applied to pin 9 of the multiplexer 42 so as to effectively operate as an error sign control in the form of a solid state switch so as to result in the selection of a positive or negative-going signal at the output of the multiplexer 42, as represented in FIG. 5. In other words, since the input on pin 3 is inverted from pin 5, the input of pin 5 is positive and pin 3 is negative with respect to the reference voltage $V_r$, and a bipolar error voltage is obtained at pin 4 by switching from one to the other when the sign track changes as sensed by the level of the signal into the level detector 46. The trim pot 54 used to adjust the output of amplifier 41 with respect to amplifier 44 so that their outputs are the same, in the absence of an input signal. Line 55 to the multiplexer 42 is connected from a power source, such as, a 12-volt DC battery source converted into 6 volts for operation of the control circuit by applying same across a resistor 67 and zenier diode 58, a capacitor 57 serving as a filter for the resultant power source. An on-off switch 60 is connected in the positive side of the line from the 12-volt power source to a servo amplifier 66.

Figure 8A:
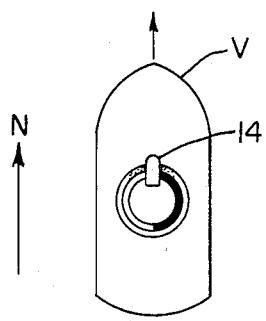
FIGS. 8A, 8B and 8C are somewhat diagrammatic illustrations of the manner in which zero position is searched for and maintained in response to changes in course heading.
Figure 8B:
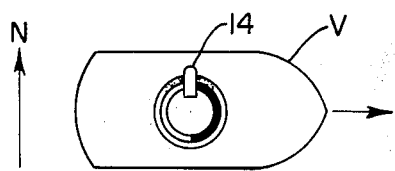
Figure 8C:
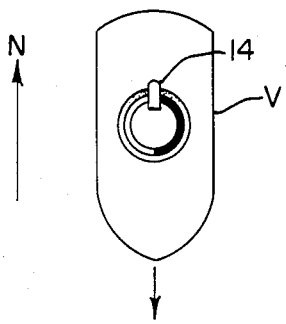
Figure 7:
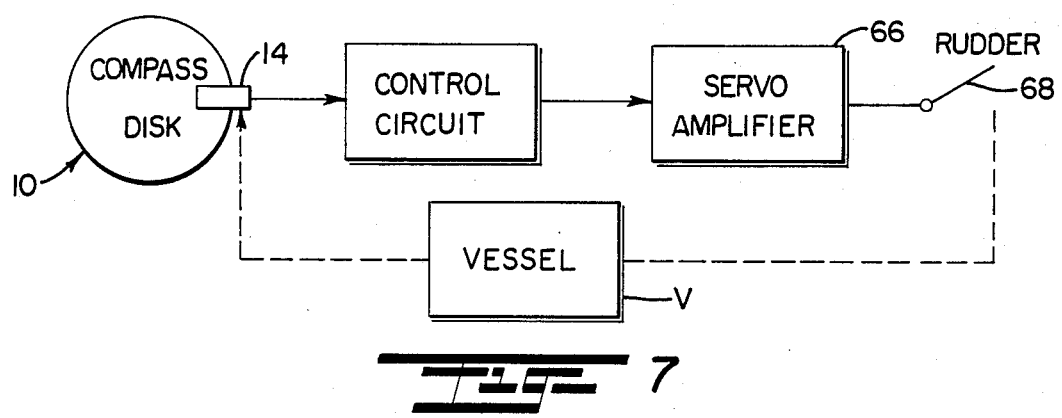
FIG. 7 is a view diagrammatically illustrating the manner in which rudder position is controlled via the compass sensor and sensor electronics in accordance with the present invention.

The entire control circuit is preferably mounted on the aperture plate 14 and therefore must be free to swivel or rotate independently of the servo amplifier and other components of the circuit into the rudder drive. Accordingly, the control circuit is most desirably mounted on the aperture plate and the output control lines are connected via slip rings to the center axis of the vial 12 into servo amplifier represented at 66. As illustrated in FIG. 7, the bipolar error signal generated by the control circuit is employed as a part of an autopilot system to command the servo amplifier 66 to impart movement to a rudder 68 thereby causing the vessel represented at V to move or turn in a direction reducing the error to zero. Accordingly, as illustrated in FIG. 8A, the aperture plate 14 is in line with the front of the vessel and aligned also with the zero reference positions on the error track. If it is desired to change the heading of the vessel, such as, illustrated in FIG. 8B, to travel in an easterly direction or 90° to that shown in FIG. 8A the aperture plate is rotated 90° in a counterclockwise direction thereby generating an error signal. The error drive for the autopilot system is shown in FIG. 7 so as to return the aperture plate to the zero reference positions, bearing in mind that the compass disk always points North. Therefore, the ship must rotate 90° to seek and maintain the zero position between the aperture plate and error tracks. In FIG. 8C, the aperture plate 14 has been rotated 180°. When this occurs, the ship must rotate through 180° to return the aperture plate to the zero reference position. In accordance with conventional practice, any suitable form of graduated dial may be used in association with the aperture plate to permit rotation of the aperture plate in effecting a change in heading of the vessel.

Figure 9:
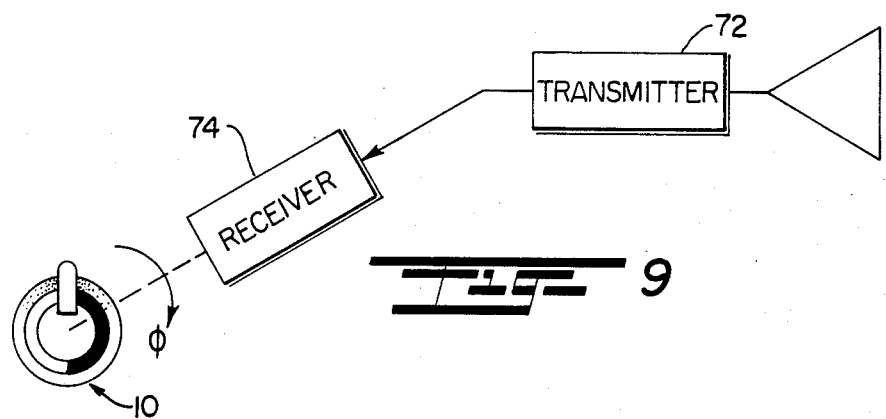
FIG. 9 is a schematic view illustrating a modified error sensing system which takes into account changes in wind direction.

FIG. 9 illustrates the manner in which the error sensing system can be employed in association with autopilot apparatus for sailboats. On sailboats, it is desirable to sail a course either relative to North or to wind direction. In sailing a course relative to wind direction, the wind direction relative to the ship's center line must be determined. A conventional form of relative wind direction transmitter 72 will detect relative wind direction and transmit that angle to a DC indicator or receiver 74 which reproduces the angle and converts into an electric signal which is transmitted in turn to the compass disk 10 so that the disk, instead of being rotated by the earth's magnetic field, is rotated by the relative wind direction indicator 74. In this way, the autopilot system will hold the ship on a course determined by wind direction and which relative angle is selected by manually rotating the aperture plate 14 with respect to the zero relative wind direction of the indicator. The transmitter 72 may, for example, be a Model 15CW5001 transmitter manufactured and sold by Scott, Incorporated of Downers Grove, Ill. A suitable form of receiver is a Model DCW0900 also manufactured and sold by Scott, Incorporated.

Figure 10:
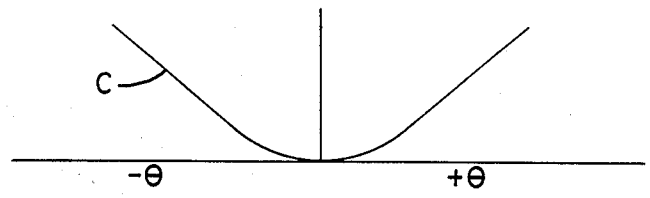
FIGS. 10, 11 and 12 graphically illustrate modified forms of error output signals resulting from variations in the transparency of the magnitude track so as to produce a non-linear responses to heading changes.
Figure 11:
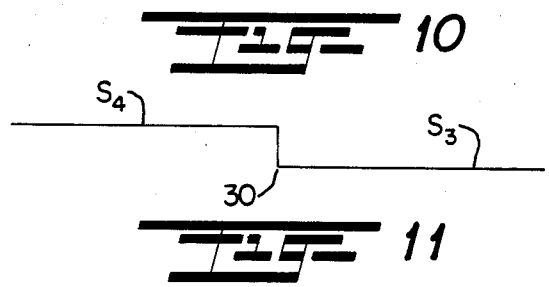
Figure 12:
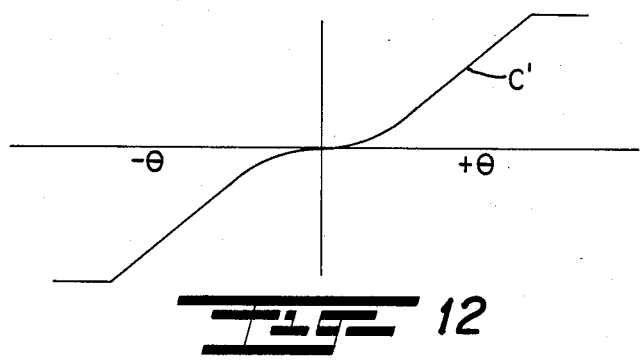

FIGS. 10 to 12 diagrammatically illustrate a modified form of sensing system in which the magnitude error track is modified such that the error signal produced is a non-linear function of the error angle. Specifically, the curve C of FIG. 10 represents the error signal produced in which the speed of response for large errors is increased by producing high loop gain; but as the error decreases the loop gain also decreases. This gain, or shape of the curve, for small errors is reduced to insure system stability near zero and can be achieved by modifying the optical disk magnitude track 25 and its relative increase or decrease in transparency to result in the desired change in error signal for a given change in error produced without in any way modifying the control circuit. Thus, the shape of the error response can be made to be any function by varying the transparency of the magnitude track and combining with an direction error signal as illustrated in FIGS. 7 or 11 to produce bipolar error signal as represented by the curve C' in FIG. 12.

Notwithstanding modifications in the transparency of the magnitude error track, it is important to note that the zero reference positions for each of the tracks are fixed and cannot change with time, temperature or other external conditions since they are fixed images. Further, the zero reference position on the direction error track uniformly produces a stable or zero output signal, as opposed to an analog value which establishes a zero reference in working with a single track; also, it is extremely difficult to develop a disk that had identical non-linear transparency above and below a reference level other than zero.

In the preferred form, the slot width for the light sensor slots 20' and 21' is on the order of 1°, and the change in transparency on the magnitude error track is established by regulating the density of a dot pattern which is then photographed to form an image on film. This image can be photographically reduced to the desired size so as to form a predetermined density or dot pattern which will closely control the amount of light passed through the track as the track advances from the zero reference position to one of maximum transparency. As related earlier, the transparency may be varied to produce different curves representative of the change in light intensity for a given change in heading or number of degrees of movement away from the zero reference point. In the alternative, other means may be selected for varying the transparency and amount of light passing through the track, such as for instance, by regulating the spacing between a series of radially extending slots; or a series of strips of paper each having progressively increased transparency can be photographically reproduced to form the desired image on film. The film is made to be of sufficient rigidity as to define the disk 10 and is suspended by the pivot mount 11 within the vial to follow the movement of the magnets 13. The aperture plate 13 is positioned such that the light sensors are in close proximity to the surfaces of the tracks 24 and 25 on the disk so as to be closely sensitive to changes in transparency and the amount of light passing through the tracks as the plate moves relative to the disk.

In the circuit shown in FIG. 6, the following representative components are given by way of illustration but not limitation: light emitters 18 and 19—TIL 24; light sensors 20 and 21—TIL 604; amplifiers 40, 41, 44 and 46—LM 2902 (one-quarter); multiplexer 42—4053 BE; diode 58—IN 5354B; transistor 52—2N 4401. The resistor 49 may be 2K ohms and the positive feedback resistors 50, 51 are 10K ohms and 150K ohms, respectively. Potentiometer 39 may be 100K ohms and the potentiometer 54 is 20K ohms. The TIL 24s are near infrared emitters and are preferred since they are well matched to the spectral response of the sensors 20 and 21. However, other light sources with broad spectral emission could be employed with other types of sensors or detectors that are responsive to variations in light intensity. Employing the representative components set forth, when the voltage at the negative input of level sensor 46 reaches a level on the order of 1.4 volts, the output of the level sensor 46 switches from a high level on the order of 10 volts to a low level near zero volts. As described, in order to assure clean switching from one level to another, the positive feedback resistors 50 and 51 produce a small amount of hysteresis. From the foregoing, it will be evident that other types of control circuits may be employed which are operative in response to receiving direction error signals indicative of the direction of movement away from the zero reference position together with magnitude error signals representing the magnitude of angular displacement away from the zero reference position to combine same into a bipolar error signal representing both the direction and magnitude of angular displacement away from the zero reference position.

It is therefore to be understood that various other modifications and changes may be made in the preferred and modified forms of invention as herein set forth without departing from the spirit and scope of the present invention as defined by the appended claims.

I claim:

1. In a system for automatic steering of a vessel wherein a compass disk is aligned with the heading North, and sensing means are associated with said compass disk to sense the relative movement between said disk and said sensing means in response to changes in the heading of said vessel with respect to North, the improvement comprising:

said disk having a first direction error surface portion provided with opaque and transparent areas defining a zero reference position therebetween and a second magnitude error surface portion disk provided with a second zero reference position thereon aligned in predetermined relation to said first zero reference position and an area extending along said second surface portion which varies in transparency away from said second zero reference position;

said sensing means having first and second light sensors aligned with said first and second surface portions, respectively, said first light sensor generating a direction error signal in response to relative movement between said sensing means and said first surface portion, and said second light sensor operative to generate a magnitude error signal in response to relative movement between said second surface portion and said sensing means; and control circuit means operative in response to simultaneous generation of direction error and magnitude error signals by said sensing means to produce a correctional signal to modify the heading of said vessel until said zero reference positions return into alignment with said light sensing means.

2. In a system according to claim 1, said first and second surface portions extending circumferentially of said compass disk, said second surface portion increasing in transparency away from said second zero reference position.

3. In a system according to claim 1, said disk and said first and second surface portions comprised of a photographic film.

4. In a system according to claim 1, said first and second surface portions defined by inner and outer concentric tracks developed on photographic film, said inner track defining said first surface portion and said outer track defining said second portion.

5. In a system according to claim 1, said sensing means defined by an aperture plate, radially spaced light generating means disposed in alignment with said first and second surface portions to direct light energy through said first and second portions and said first and second light sensors aligned with said light generating means on opposite sides of said first and second surface portions to that of said light generating means whereby to generate said direction error and magnitude error signals in response to the intensity of light passing through said first and second surface portions.

6. In an autopilot system for automatic steering of marine craft wherein an aperture plate is associated with a compass disk to sense the relative movement between said disk and said plate in response to changes in the heading of said craft with respect to North, the improvement comprising:

a first direction error track on said compass disk having opaque and transparent areas defining a zero reference area therebetween;

a second magnitude error track on said compass disk having a second zero reference position thereon aligned in predetermined relation to said first zero reference position, and light control means extending along said second track away from said second zero reference position;

said aperture plate having first and second light sensing means aligned with said first and second tracks, respectively, said first light sensing means generating a direction error signal in response to relative movement between said aperture plate and said disk, and said second light sensing means operative to generate a magnitude error signal in response to relative movement between said aperture plate and said disk; and control circuit means operative in response to simultaneous generation of direction error and magnitude error signals by said light sensing means to produce a correctional signal to modify the heading of said vessel until said light sensing means return into alignment with said reference positions.

7. In a system according to claim 6, said first and second tracks extending circumferentially of said compass disk in concentric relation to one another.

8. In a system according to claim 6, said first and second tracks defined by images on a photographic film.

9. In a system according to claim 6, said first and second tracks defined by inner and outer concentric tracks developed on photographic film radially spaced light emitter means disposed in alignment with said first and second tracks to direct light energy therethrough and said light sensing means aligned with said light emitter means on the opposite side of said first and second tracks to generate said direction error and magnitude error signals in response to the intensity of light passing through said first and second tracks.

10. In an error sensing system for sensing angular displacement of a movable object away from a reference point wherein said system has a magnetic compass disk aligned in predetermined relation to said reference point and said object is angularly displaceable independently of said compass disk, the improvement comprising:

light emitter means disposed on one side of said compass disk, first and second light sensing means disposed on an opposite side of said compass disk in the path of light directed through said compass disk from said light emitter means, direction error means on said compass disk in the path of light from said light emitter means to said light sensing means, said direction error means having a first zero reference position aligned with said reference point and being operative to produce one predetermined level of light in one direction of angular displacement away from said first zero reference position and another predetermined level of light in an opposite direction of angular displacement away from said zero reference position;

magnitude error means disposed in the path of light from said light emitter means to said second light sensing means and having a second zero reference position aligned with said reference point, said magnitude error means operative to produce predetermined variations in light intensity symmetrically in opposite directions of angular displacement away from said second zero reference position; and control circuit means operative in response to receiving direction error signals indicative of the direction of movement away from said first zero reference position and magnitude error signals indicative of the magnitude of angular displacement away from said second zero reference position to produce bipolar error signals representing the direction and magnitude of angular displacement away from said first and second zero reference positions.

11. In a system according to claim 10, said control circuit having a comparator amplifier operative to generate a signal corresponding to the magnitude of signals of said magnitude error sensing means, a level shift network associated with said comparator, and a level sensing amplifier operative in response to the sign of the direction error signal, and a multiplexer operative in response to the sign of the signal of said level sensing amplifier to generate either a positive or negative bipolar error signal of a magnitude corresponding to that received from said comparator amplifier.

12. In a system according to claim 10, said direction error means and said magnitude error means defined by inner and outer concentric tracks having zero reference positions aligned with one another.

13. In a system according to claim 12, said magnetic compass defined by a photographic film and said tracks formed as images on said film.

14. In a system according to claim 13, each of said tracks having images of different selected light tranparencies formed thereon.

15. In a system according to claim 14, said magnitude error track having a pattern of opaque dots of a predetermined density to vary the transparency of the image on said photographic film to vary along a curve of predetermined intensity from opaque at the second zero reference position to one of maximum transparency a predetermined number of degrees in opposite directions away from said second zero reference position.

* * * * *